United States Patent [19]
Stuedemann et al.

[11] Patent Number: 6,019,391
[45] Date of Patent: Feb. 1, 2000

[54] STEERING COLUMN FOR MOTOR VEHICLE

[75] Inventors: Richard Thomas Stuedemann, Hemlock; Leroy L. Gatz, Midland; Xiaoyu Li, Saginaw; Floyd E. Eschenbacher, Jr., Saginaw; Kevin Lawrence Roe, Saginaw; Kevin Carlton Ross, Hemlock, all of Mich.

[73] Assignee: General Motors Corporation, Detroit, Mich.

[21] Appl. No.: 09/072,236

[22] Filed: May 4, 1998

[51] Int. Cl.[7] .................................................. B62D 1/16
[52] U.S. Cl. ..................... 280/779; 280/777; 280/780; 280/775; 74/493
[58] Field of Search ................................... 280/779, 777, 280/780, 775; 74/492, 493; 188/371

[56] References Cited

U.S. PATENT DOCUMENTS

| 3,693,997 | 9/1972 | Dreyer | 280/87 |
| 5,081,879 | 1/1992 | Pidgeon | 74/492 |
| 5,090,730 | 2/1992 | DuRocher et al. | 280/775 |
| 5,259,818 | 11/1993 | Kachi et al. | 280/777 |
| 5,673,937 | 10/1997 | Fevre et al. | 280/777 |
| 5,685,565 | 11/1997 | Schafer et al. | 280/777 |
| 5,704,642 | 1/1998 | Jurik et al. | 280/779 |
| 5,704,651 | 1/1998 | Shimizu et al. | 280/775 |

*Primary Examiner*—Christopher P. Ellis
*Attorney, Agent, or Firm*—Edmund P. Anderson

[57] ABSTRACT

A steering column for a motor vehicle having a gear box of an electric power assist apparatus in front of the steering column. The steering column includes a rigid mast jacket consisting of a short tubular sleeve and a bracket attached to the tubular sleeve having a pair of laterally separated guides straddling the gear box. A pair of lugs on the gear box cooperate with a pair of elongated slots in the guides in connecting the mast jacket to the gear box for vertical pivotal movement and for linear translation. A longitudinally collapsible steering shaft is rotatably supported on the tubular sleeve with a steering hand wheel at one end and a flexible coupling at the other end connecting the steering shaft to an input shaft on the gear box. The tubular sleeve is connected to the vehicle body by a clamp which releases the tubular sleeve for a collapse stroke of the mast jacket. The mast jacket protects the steering shaft against beam bending during the collapse stroke. The unobstructed span in front of the tubular sleeve between the guides yields a collapse stroke of the mast jacket consistent with acceptable performance of an energy absorber.

3 Claims, 4 Drawing Sheets

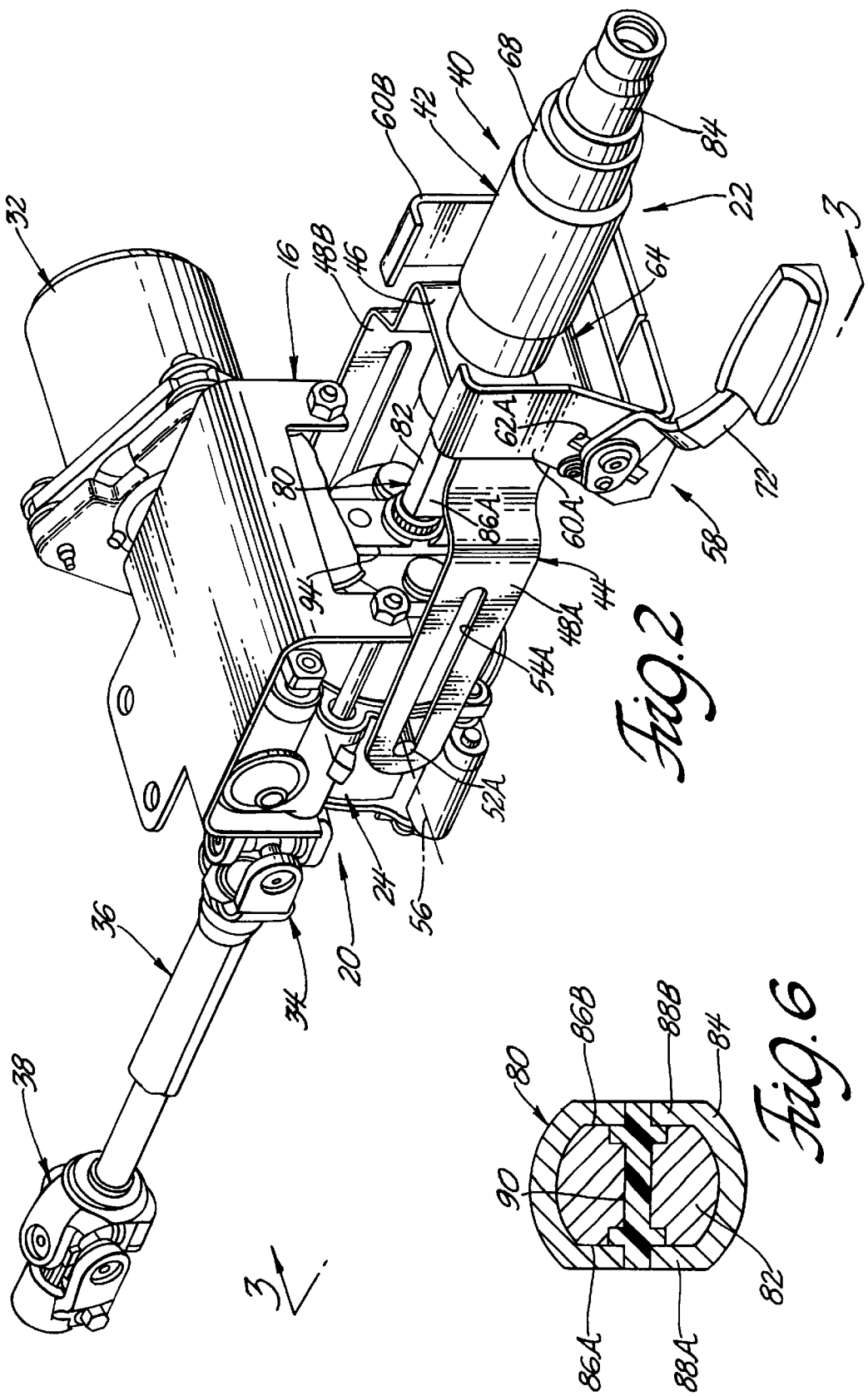

STEERING COLUMN FOR MOTOR VEHICLE

TECHNICAL FIELD

This invention relates to a steering column for a motor vehicle.

BACKGROUND OF THE INVENTION

An energy absorbing steering column for a motor vehicle commonly includes a mast jacket consisting of a pair of telescopically related tubular elements, a steering shaft consisting of a pair of telescopically related shaft elements, and a steering hand wheel on the steering shaft. The steering shaft is rotatably supported on the mast jacket and collapses longitudinally with the mast jacket in response to an impact on the steering hand wheel. An energy absorber converts into work a fraction of the kinetic energy of the impact in response to longitudinal collapse of the mast jacket. In such steering columns, the mast jacket must be long enough to accommodate a longitudinal collapse stroke consistent with acceptable energy absorbing performance and the span of the telescopic overlap between the tubular elements thereof must afford enough rigidity in beam bending to substantially isolate the steering shaft from beam bending forces which would otherwise interfere with smooth longitudinal collapse of the steering shaft. In a motor vehicle having a stationary electric power assist apparatus in front of the steering column, the space occupied by the electric power assist apparatus reduces the space available for the mast jacket of such prior steering columns to the extent that the length of the mast jacket may not be consistent with both acceptable performance of the energy absorber and acceptable rigidity in beam bending. A steering column according to this invention has a longitudinal collapse stroke consistent with acceptable energy absorbing performance and has acceptable rigidity in beam bending in a motor vehicle environment including a stationary electric power assist apparatus in front of the steering column.

SUMMARY OF THE INVENTION

This invention is a new and improved steering column for a motor vehicle having an electric power assist apparatus on a body of the motor vehicle in front of the steering column. The steering column includes a rigid, one-piece mast jacket consisting of a short tubular sleeve and a bracket rigidly attached to the tubular sleeve having a pair of long, laterally separated guides straddling a gear box of the electric power assist apparatus. A pair of lugs on the gear box cooperate with respective ones of a pair of elongated slots in the guides in connecting the mast jacket to the gear box for vertical pivotal movement about a lateral centerline of the gear box and for linear translation perpendicular to the lateral centerline. A steering shaft consisting of telescopically related shaft elements is rotatably supported on the tubular sleeve. The steering shaft has a steering hand wheel at one end and a flexible coupling at the other end connecting the steering shaft to an input shaft on the gear box. The tubular sleeve is connected to the body of the motor vehicle by a clamp which releases the tubular sleeve for a collapse stroke of the mast jacket. The rigidity of the one-piece mast jacket in beam bending protects the steering shaft during longitudinal collapse. Because the guides on the mast jacket straddle the gear box and are not in front of the tubular sleeve, the unobstructed span available for linear translation of the tubular sleeve yields a collapse stroke of the mast jacket consistent with acceptable performance of an energy absorber.

BRIEF DESCRIPTION OF THE DRAWINGS

FIG. 2 is a partially broken-away perspective view of the steering column according to this invention;

FIG. 6 is an enlarged sectional view taken generally along the plane indicated by lines 6—6 in FIG. 5.

DESCRIPTION OF THE PREFERRED EMBODIMENT

Figure 1:
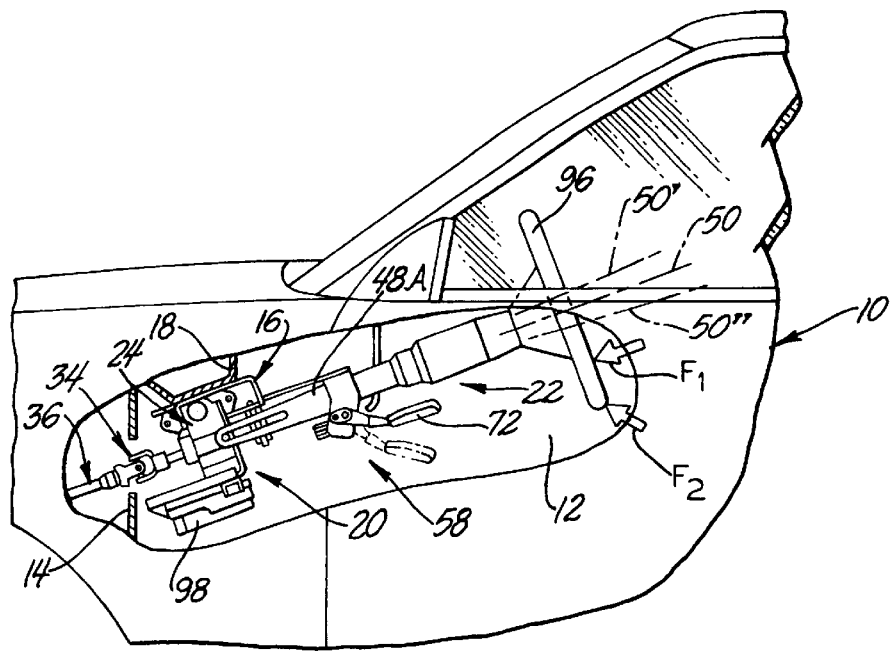
FIG. 1 is an elevational view of a steering column according to this invention on a motor vehicle.

Referring to FIGS. 1–5, a body 10 of a motor vehicle has a passenger compartment 12 therein behind a schematically represented vertical panel 14 of the body. A generally flat support panel 16 is rigidly connected to the body 10 of the motor vehicle through a schematically represented bracket 18 behind the vertical panel 14. An electric power assist apparatus 20 is suspended from the support panel 16 adjacent the vertical panel 14. A steering column 22 according to this invention is suspended from the support panel 16 behind the electric power assist apparatus.

The electric power assist apparatus includes a fragmentarily illustrated stationary gear box or housing 24 rigidly connected to the support panel 16, a tubular input shaft 26 rotatably supported on the gear box, a tubular output shaft 28 supported on the gear box for rotation relative to the input shaft, and an internal torsion bar 30 connected at one end to the input shaft and at the other end to the output shaft. The output torque of an electric motor 32 mounted on the gear box 24 is applied to the output shaft 28 through reduction gears, not shown, in the gear box. A universal coupling 34 connects the output shaft to an intermediate steering shaft 36 in front of the vertical panel 14. Another universal coupling 38 connects the intermediate steering shaft 36 to a pair of steered wheels, not shown, of the motor vehicle through a conventional steering gear, not shown.

As seen best in FIGS. 2–5, the steering column 22 includes a mast jacket 40 consisting of a tubular sleeve 42 and a U-shaped bracket 44 welded or otherwise rigidly attached to the tubular sleeve so that the mast jacket is effectively a rigid, one-piece structural element of the steering column. The U-shaped bracket 44 has a web 46 and a pair of wide, flat guides 48A,48B straddling the gear box 24 parallel to a longitudinal centerline 50 of the mast jacket. A pair of rigid lugs 52A,52B on the gear box are closely received in respective ones of a pair of elongated slots 54A,54B in the guides 48A,48B. The longitudinal centerline 50 of the mast jacket intersects a lateral centerline 56 of the gear box defined by the lugs 52A,52B so that the lugs cooperate with the elongated slots in connecting the mast jacket to the gear box for up and down pivotal movement about the lateral centerline and for linear translation in the direction of the longitudinal centerline 50 of the mast jacket.

Figure 5:
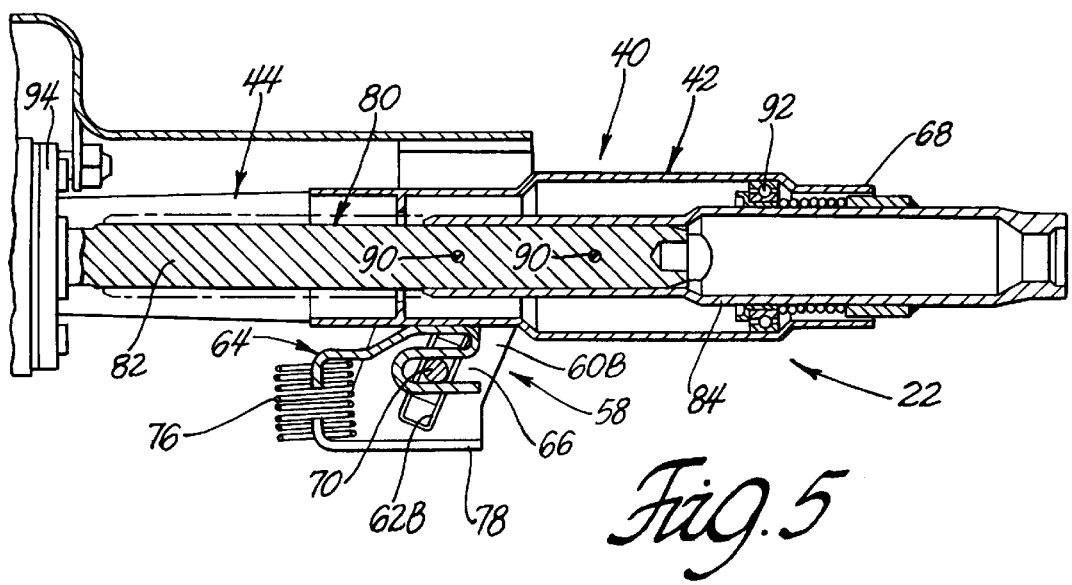
FIG. 5 is a sectional view taken generally along the plane indicated by lines 5—5 in FIG. 4.
Figure 3:
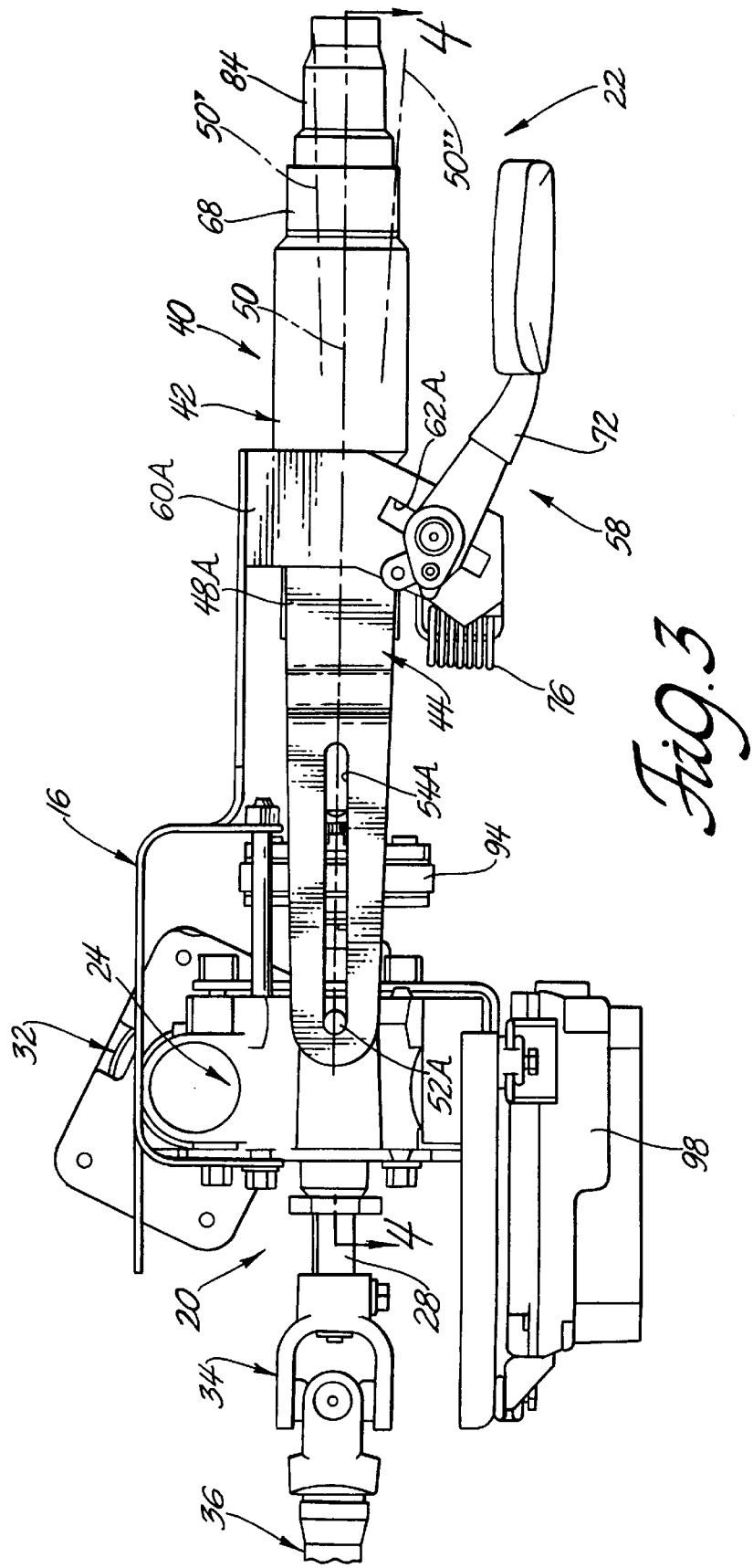
FIG. 3 is a view taken generally along the plane indicated by lines 3—3 in FIG. 2.
Figure 4:
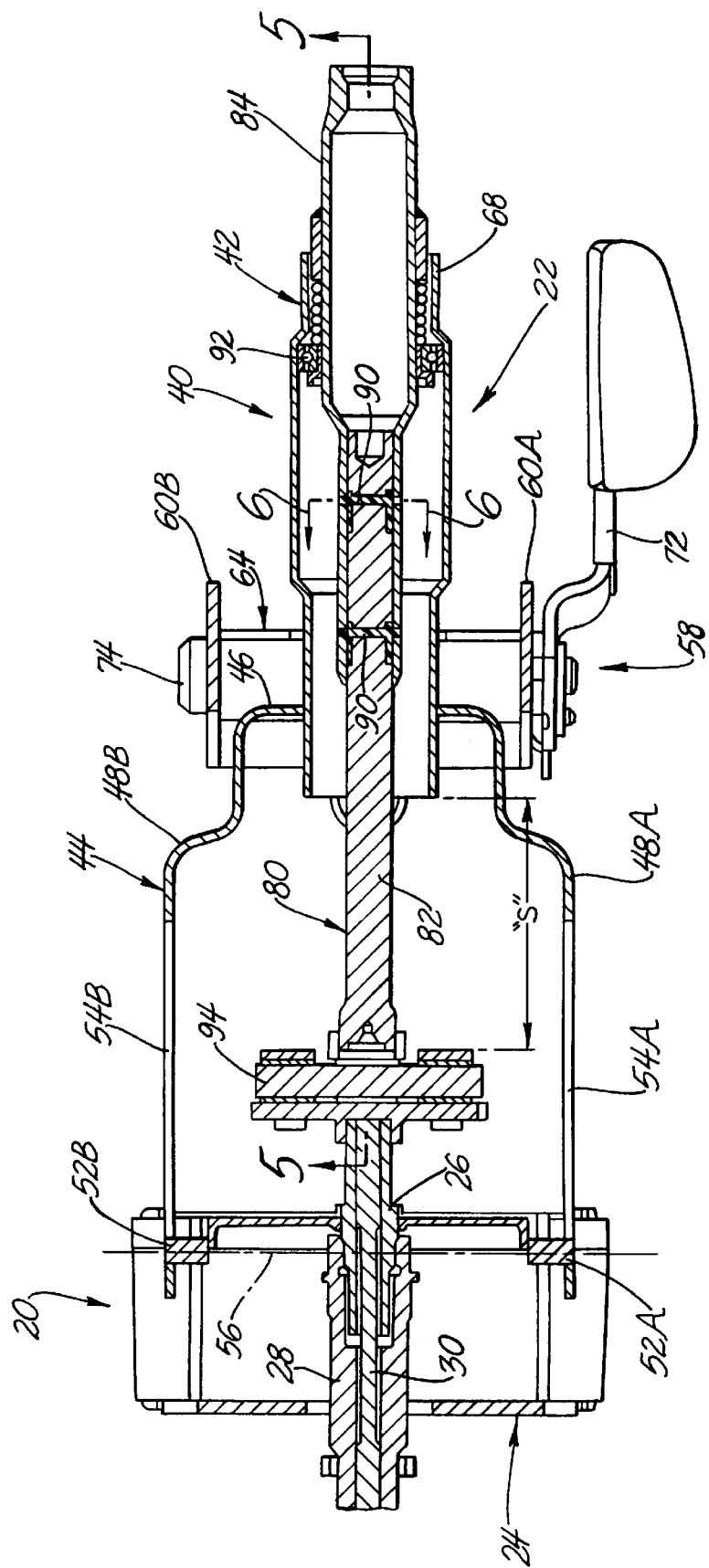
FIG. 4 is a sectional view taken generally along the plane indicated by lines 4—4 in FIG. 3.

A clamp 58 of the steering column 22 includes a pair of vertical brackets 60A,60B on opposite sides of the tubular sleeve 42 attached to the support panel 16. The vertical brackets 60A,60B are perforated by respective ones of a pair of substantially vertical slots 62A,62B. A spacer 64, FIGS. 4–5, is welded or otherwise rigidly attached to the tubular sleeve between the vertical brackets and includes an undulation defining a lateral slot 66 in the spacer open toward an outboard end 68 of the tubular sleeve.

A control shaft 70 of the clamp 58 spans the vertical brackets 60A,60B through the vertical slots 62A,62B and seats in the slot 66 in the spacer so that the control shaft is supported on the tubular sleeve for up and down pivotal movement as a unit with the mast jacket 40 about the lateral centerline 56. The ends of the vertical slots 62A,62B cooperate with the control shaft in defining an upper limit position 50' and a lower limit position 50" of the mast jacket 40. A control lever 72 is rigidly attached to the control shaft 70 outboard of the vertical bracket 60A. The control shaft is pivotable as a unit with the control lever between a locked position of the control lever and an unlocked position thereof shown in solid and broken lines, respectively, in FIG. 1. A nut 74 on a screw-threaded end of the control shaft outboard of the other vertical bracket 60B is restrained against rotation relative to the vertical bracket 60B.

Pivotal movement of the control lever 72 from its unlocked position to its locked position squeezes the vertical brackets 60A,60B against the ends of the spacer 64 to capture by friction the position of the mast jacket 40 between its limit positions 50',50". Pivotal movement of the control lever 72 from its locked position to its unlocked position releases the friction couple between the vertical brackets and the ends of the spacer to release the mast jacket for up and down pivotal movement between its limit positions 50',50". A spring 76, FIG. 5, between the spacer 64 and a platform 78 defined by the vertical brackets 60A,60B biases the mast jacket toward its upper limit position 50'.

A longitudinally collapsible steering shaft 80 of the steering column 22 includes a solid lower shaft element 82 and a tubular upper shaft element 84 telescopically overlapping the lower shaft element. The solid shaft element has a pair of flat sides 86A,86B cooperating with a corresponding pair of flat sides 88A,88B on the tubular shaft element, FIG. 6, in coupling the solid and tubular shaft elements for unitary rotation and for relative linear translation. A plurality of plastic pins 90 are molded-in-place in corresponding passages in the solid and tubular shaft elements and resist relative linear translation between the solid and tubular shaft elements until the material strength of the pins is exceeded. A bearing 92 is interference fitted between the tubular shaft element 84 and the tubular sleeve 42 and supports the steering shaft 80 on the mast jacket 40 for rotation about the longitudinal centerline 50 of the mast jacket. A flexible coupling 94 is connected to the solid shaft element 82 and to the input shaft 26 on the gear box 24. A steering hand wheel 96 is attached to the tubular shaft element 84 at the top of the steering column 22.

Manual effort applied at the steering hand wheel 96 is transferred by the steering shaft 80 and the flexible coupling 94 to the input shaft 26 and rotates the input shaft relative to the output shaft 28 against a restoring force induced by the torsion bar 30. A control module 98 mounted below the gear box 24 turns the electric motor 32 on and off in accordance with a signal from a torque sensor, not shown, in the gear box. The output torque of the electric motor supplements the manual effort applied to the output shaft through the torsion bar to steer the motor vehicle.

The force of an impact on the steering hand wheel 96 represented by a schematic force vector "$F_1$" is transferred from the tubular shaft element 84 of the steering shaft to the tubular sleeve 42 of the mast jacket through the bearing 92. With the control lever 72 in its locked position, such force is resisted by the friction couple between the spacer 64 and the vertical brackets 62A,62B. When the friction couple between the vertical brackets and the spacer is overpowered, the spacer slides forward from between the vertical brackets, the control shaft 70 releases from the slot 66 through the open side thereof, and the spring 76 releases from between the spacer and the platform 78. Thereafter, the mast jacket 40 traverses a collapse stroke "S", FIG. 4, as the elongated slots 54A,54B in the guides 48A,48B slide over the lugs 52A,52B on the gear box and cooperate in controlling the position of the lower end of the mast jacket during the collapse stroke. An energy absorber, not shown, between the mast jacket 40 and the vehicle body 10 converts into work a fraction of the kinetic energy of the impact on the steering hand wheel 96 in response to linear translation of the mast jacket through its collapse stroke "S". Importantly, because the guides on the mast jacket straddle the gear box and are not in front of the tubular sleeve, the unobstructed span available for linear translation of the tubular sleeve yields a collapse stroke "S" consistent with acceptable performance of the aforesaid energy absorber.

At the same time that the spacer 64 releases from between the vertical brackets 62A,62B, the plastic pins 90 fracture to release the solid and the tubular shaft elements 82,84 for relative telescopic collapse. Because the input shaft 26 on the gear box 24 and the flexible coupling 94 resist linear translation of the solid shaft 82 in the direction of the impact on the steering column represented by the force vector "$F_1$," the tubular shaft element 84 collapses telescopically over the solid shaft element concurrent with linear translation of the mast jacket 40 through its collapse stoke "S".

In the circumstance that an impact on the steering hand wheel 96 represented by a second schematic force vector "$F_2$", FIG. 1, thrusts the mast jacket 40 upward during its collapse stroke against the support panel 16 between the vertical brackets 62A,62B, force reactions at the lugs 52A, 52B and at the support panel load the mast jacket in beam bending. Because the mast jacket is effectively a rigid, one-piece structural element of the steering column and because of the relatively long span between the lugs and the vertical brackets made possible by the guides 48A,48B straddling the gear box 24, the mast jacket successfully resists significant deflection in beam bending. Accordingly, the mast jacket effectively isolates the steering shaft 80 from force reactions which would otherwise load the steering shaft in beam bending and significantly increase sliding friction between the solid and tubular shaft elements 82,84 during the collapse stroke "S" of the mast jacket.

Having thus described the invention, what is claimed is:

1. A steering column for a motor vehicle having a gear box of an electric power assist apparatus mounted on a body of said motor vehicle in front of said steering column comprising:

a mast jacket including a tubular sleeve and a bracket rigidly attached to said tubular sleeve having a pair of laterally separated guides straddling said gear box, a mounting means operative to connect said mast jacket to said gear box for up and down pivotal movement about a lateral centerline of said gear box and for linear translation in the direction of a longitudinal centerline of said mast jacket intersecting said lateral centerline of said gear box, a longitudinally collapsible steering shaft supported on said tubular sleeve for rotation about said longitudinal centerline of said mast jacket having a steering hand wheel thereon at a first end of said mast jacket, a flexible coupling between said laterally separated guides connected to said steering shaft and to an input shaft on said gear box, and a clamp means rigidly attached to said body of said motor vehicle around said tubular sleeve operative to define an upper limit position and a lower limit position of vertical pivotal movement of said mast jacket about said lateral centerline of the gear box and to capture by friction the position of said tilt housing between said upper limit position and said lower limit position thereof in response to pivotal movement of a control lever from an unlocked position thereof to a locked position thereof, an impact on said steering hand wheel being operative to overpower the friction couple between said clamp means and said tubular sleeve on said mast jacket to release said mast jacket for linear translation through a collapse stroke during which said mounting means controls the position of a second end of said mast jacket opposite to said first end of said mast jacket.

2. The steering column for a motor vehicle recited in claim 1 wherein said mounting means comprises:

a pair of lugs on said gear box defining said lateral centerline of said gear box, and a pair of elongated slots in respective ones of said guides straddling said gear box closely and slidably receiving respective ones of said pair of lugs on said gear box.

3. The steering column for a motor vehicle recited in claim 2 wherein said clamp means comprises:

a pair of vertical brackets connected to said body of said motor vehicle on opposite sides of said tubular sleeve, a pair of substantially vertical slots in respective ones of said vertical brackets, a spacer rigidly attached to said tubular sleeve between said vertical brackets having a slot therein open toward said first end of said mast jacket, a control shaft rigidly connected to said control lever traversing said pair of vertical brackets through said pair of substantially vertical slots therein and seated in said slot in said spacer so that said control shaft is pivotable up and down as a unit with said mast jacket about said lateral centerline of said gear box between said upper and said lower limit positions defined by engagement of said control shaft against opposite ends of said pair of substantially vertical slots, and a fastener means operative in response to rotation of said control shaft as unit with said control lever from said unlocked position of said control lever to said locked position thereof to tension said control shaft between said pair of vertical brackets and thereby squeeze said pair of vertical brackets against respective ones of a pair of opposite ends of said spacer.

* * * * *